United States Patent [19]

Fuminier

[11] Patent Number: 4,517,867
[45] Date of Patent: May 21, 1985

[54] METHOD AND APPARATUS FOR CUTTING A CAST IRON PIPE

[75] Inventor: Claude B. Fuminier, Pont-A-Mousson, France

[73] Assignee: Pont-A-Mousson S.A., Pont-A-Mosson, France

[21] Appl. No.: 556,220

[22] Filed: Nov. 29, 1983

[30] Foreign Application Priority Data

Dec. 10, 1982 [FR] France .................................. 82 20733

[51] Int. Cl.³ ........................... B23B 3/04; B23B 5/14; B26B 27/00; B26D 3/16
[52] U.S. Cl. ......................................... 82/101; 82/59; 82/48; 30/94
[58] Field of Search .................. 82/47, 48, 94, 95, 96, 82/97, 98, 100, 101, 102, 4 C, 59; 30/93, 94, 95, 96

[56] References Cited

U.S. PATENT DOCUMENTS

| | | | |
|---|---|---|---|
| 746,076 | 12/1903 | Headson | 30/94 |
| 2,016,735 | 10/1935 | Abramson et al. | 30/94 |
| 3,691,881 | 9/1972 | Bachmann | 82/4 C |
| 3,699,828 | 10/1972 | Piatek et al. | 82/4 C |
| 3,807,047 | 4/1974 | Sherer et al. | 30/97 |
| 4,180,358 | 12/1979 | Uribe | 409/179 |
| 9,429,445 | 2/1984 | Fuminier | 29/33 T |

Primary Examiner—Francis S. Husar
Assistant Examiner—William E. Terrell
Attorney, Agent, or Firm—Sughrue, Mion, Zinn, Macpeak and Seas

[57] ABSTRACT

A cast iron pipe T with a minimal preset diameter is supported by a frame 1 equipped with support rollers 2, 6, the roller 2 being driven to rotate the pipe about axis X-X. Cutting is executed with a tool 16 coupled to the carrier roller 2. The rollers are disposed below the pipe, and the pipe is held against the rollers during cutting by a pressing roller 5 disposed inside the pipe end. The pressing roller is shifted downwardly in relation to the carrier roller.

3 Claims, 12 Drawing Figures

METHOD AND APPARATUS FOR CUTTING A CAST IRON PIPE

BACKGROUND OF THE INVENTION

This invention concerns a method and device for cutting a tubular part having a large diameter that is made from a rigid material, especially with an oval section, such as a cast iron, steel, plastic or fibrocement pipe.

Commonly assigned U.S. patent application Ser. No. 532,630, filed Sept. 15, 1983, describes a universal cutting method and device capable of cutting pipe of any diameter, especially cast iron pipes. Furthermore, a bevel may be cut with a preset profile. According to this method, each cutting tool is mechanically coupled with a roller so that the cutting edge of the tool and the contact point between the rotating roller and the outer wall of the tube to be cut are substantially contained in a common radial plane passing through the lengthwise axis of the tube. This arrangement displays the advantage of maintaining a constant penetration of the cutting tool into the wall of the tube even if its radius of curvature varies, for instance, if the tube is oval or elliptical. Therefore, perfectly regular bevels are obtained along the entire circumference of a part with an oval section.

The mechanical cutter for implementing this method can cut pipes over a very extensive range of diameters and therefore, in that sense, it is universal.

Such a machine is satisfactory, but in view of the number of rollers and jacks which it includes, which are scattered about the outer circumference of the tube, its cumbersomeness increases as the diameter of the tube increases. As a result, the cutter of that invention is effective but difficult to use.

The cutter of this invention is designed to achieve a simpler device and consequently it is less cumbersome and easier to use. It is especially useful for cutting pipes with large diameters, for instance which are greater than 700 mm but it is applicable for all diameters exceeding a preset minimum, for instance about 300 mm.

In the method of this invention for cutting a tubular part with a diameter exceeding a preset minimum, especially a cast iron pipe, a support frame part is equipped with rollers designed to accommodate the end of the part to be cut. Driving means rotate some of the rollers so as to make the tubular part turn about its axis while maintaining it translationally fixed. The cutting phase is executed with at least one cutting tool that is radially coupled to a roller.

According to the invention, this method is characterized in that at least one of the rollers that support the tube from below is coupled with a cutting tool. At least one pressing roller, which is introduced inside the tube, presses the tube against this supporting roller during rotation and cutting. After the cutting is completed, the inner pressing roller is withdrawn to clear the cut tube.

Thus, instead of distributing the rollers along the entire circumference of the tubular section to be cut as in the previous universal mechanical cutter, the carrier rollers are concentrated below that section, or below a horizontal plane which goes through the axis of the tubular part. The large diameter of the pipe is exploited to house inside it at least one pressing roller or "pincher", which is designed to maintain the end of the pipe against the support rollers during the cutting phase.

By concentrating the rollers below the end of the pipe, the size of the support frame for the rollers is reduced. Therefore, its cumbersomeness and its weight, as well as the number of rollers and their drive trains, are reduced. Hence, the cost of the cutting machine is also substantially reduced.

Practically speaking, the minimal diameter of the pipe which can be cut under those circumstances is about 300 mm, while its optimal diameter can exceed 1,000 mm.

However, for a specific value of the cutting angle of the tool, i.e., the angle between the tangent of the cutting edge of the tool face at the surface to be cut upon it and the perpendicular of the tangent of the surface to be cut at the contact point of the cutting edge of the tool with the surface, there corresponds a set range of acceptable pipe diameters. This set range arises from the fact that for satisfactory cutting, the cutting angle must not vary beyond the limits provided on either side of said given value of the cutting angle. Thus, cast iron of spheroidal graphite (ductile cast iron) is best cut with cutting tools of which the ideal cutting angle is about $-3°$ with a tolerance of $\pm 2°$ or $3°$ about that value. Therefore, with an initial adjustment of the cutting angle at $-3°$, adequate cutting can be achieved for a series of pipes, the diameters of which vary, so long as the cutting angle does not exceed the above tolerance limits.

Hence, when it is desired to cut pipes for which the cutting angle might exceed those tolerances, it is necessary to proceed with a new adjustment of the cutting angle of the tool, either manually or automatically, for instance with a screw jack.

Therefore, with successive adjustments of the angular positions of the tool, a sequence of pipes can be cut for which the diameters are included more or less between the limits indicated above, the lower limit of about 300 mm being practically imposed by the requirement of introducing a pressing roller inside the pipe.

BRIEF DESCRIPTION OF THE DRAWINGS

Other details and advantages of the invention will become apparent in the description which follows, in reference to the attached drawings which illustrate several of its embodiments as non-limiting examples.

DETAILED DESCRIPTION OF THE PREFERRED EMBODIMENTS

Figure 1:
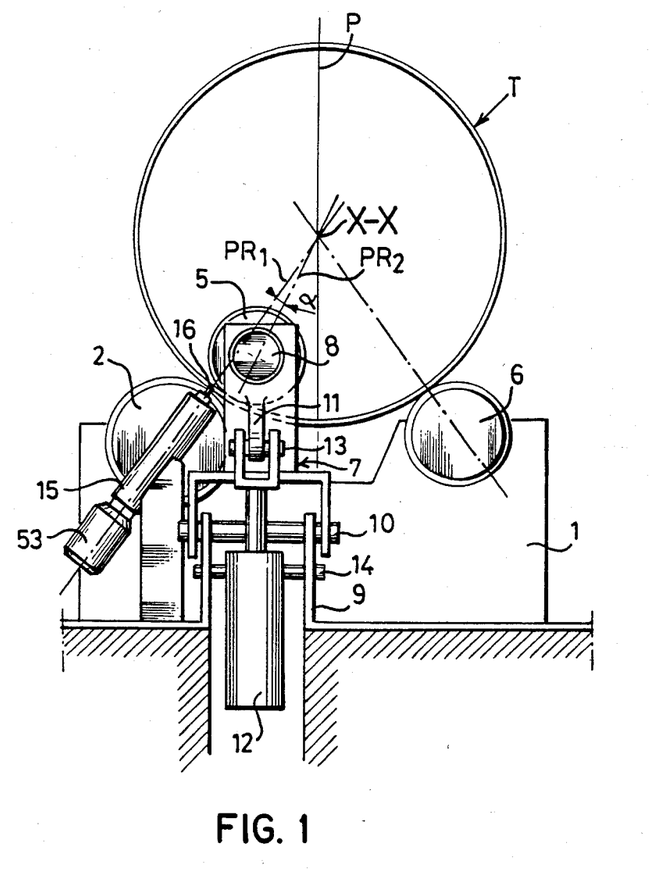
FIG. 1 is a simplified elevated exploded end view of a first embodiment of a device for cutting tubular parts according to the invention.
Figures 2, 2A:
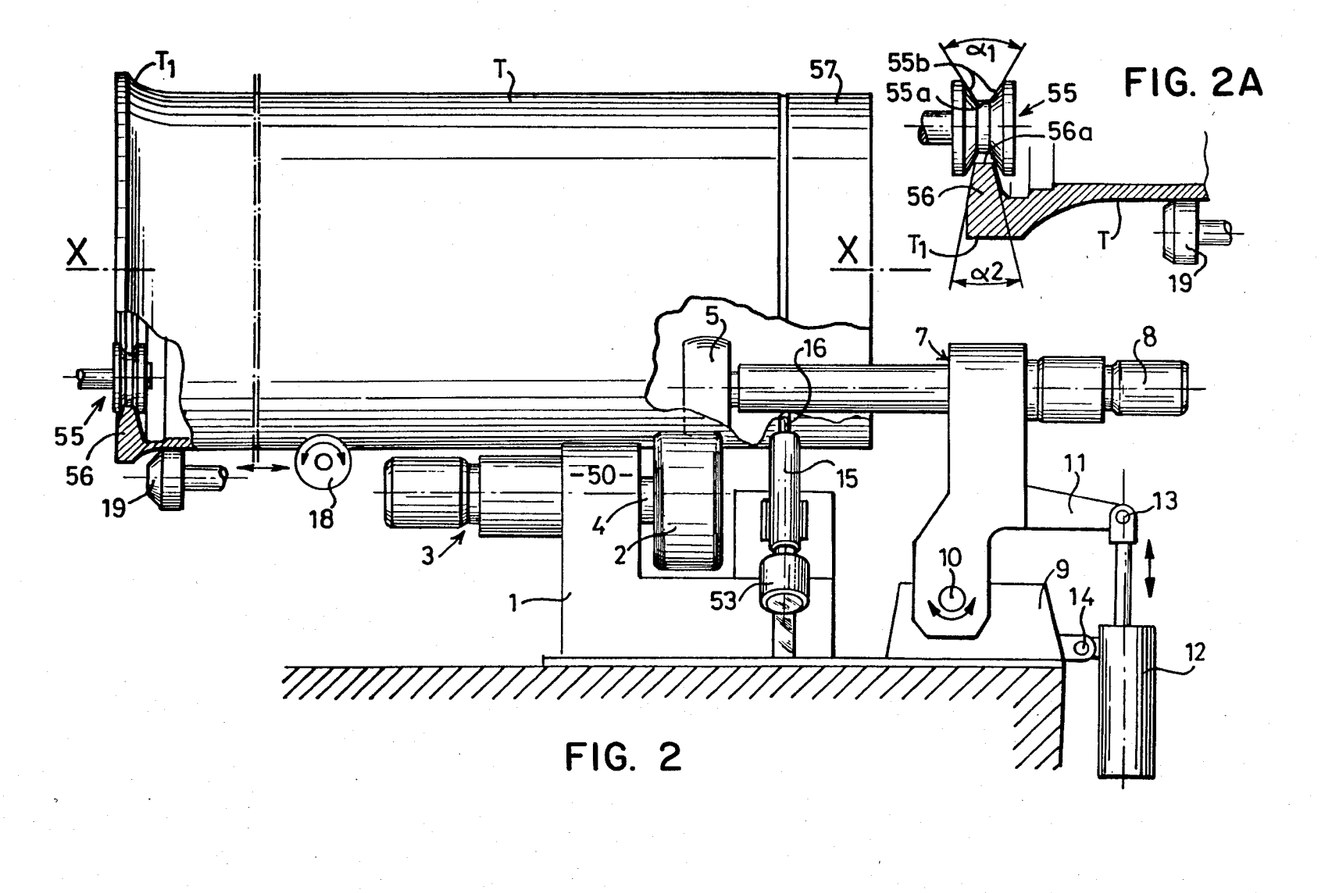
FIG. 2 is a simplified elevated exploded lengthwise view of the device in FIG. 1, the inner roller being in place inside the pipe.
FIG. 2A is a detailed view at an enlarged scale of the device in FIG. 2.
Figure 3:
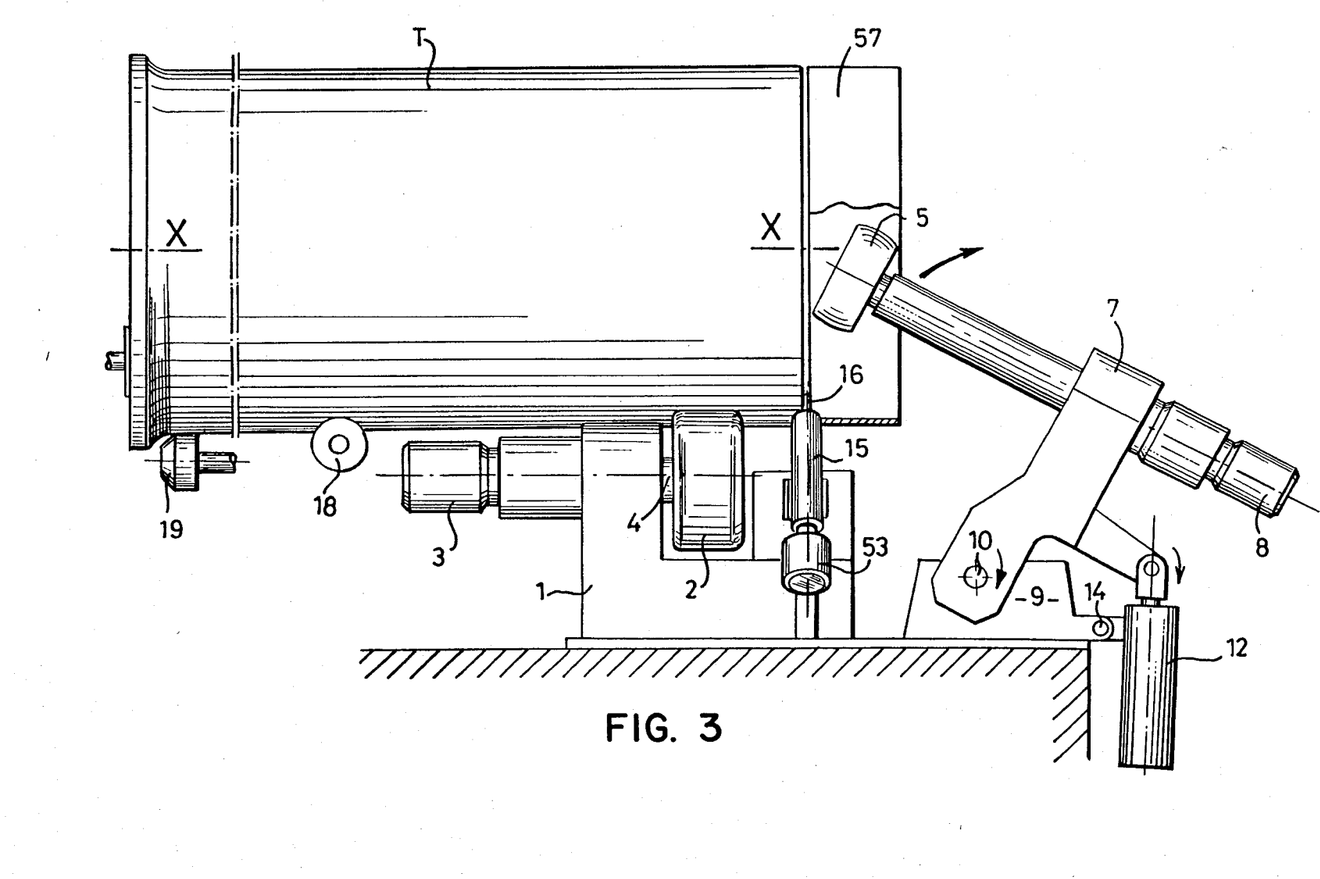
FIG. 3 is an elevated view which is analogous to FIG. 2 and displays the withdrawn pinching roller outside of the cut end of the pipe.
Figure 4:
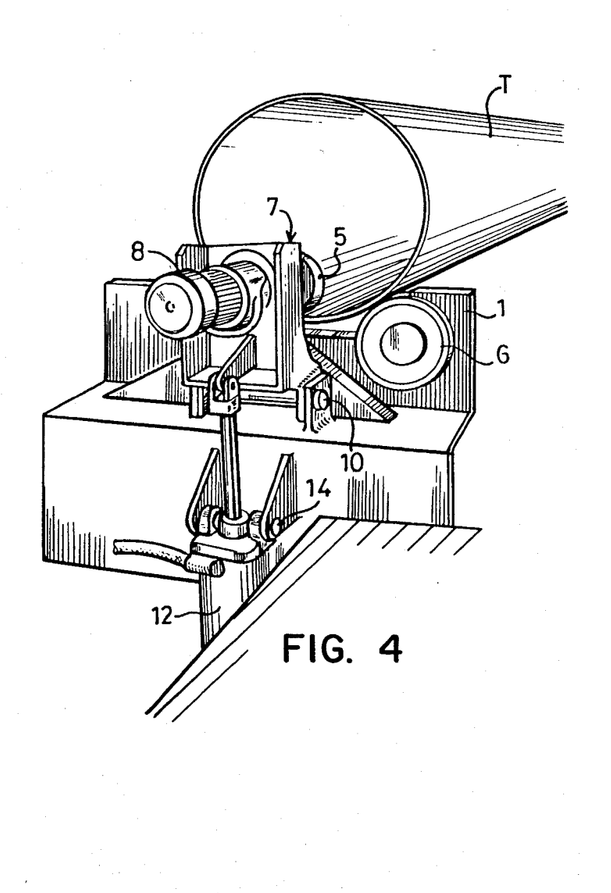
FIG. 4 is a perspective view of the cutting device which is depicted with the pressing and pinching roller in its place inside the tubular part.

The device which is depicted in the drawings is designed to cut a set length of a tubular part or tube T, with preferably, but not necessarily, a selected profile bevel on the cut end. The tube T is composed of a rigid material like cast iron, especially ductile cast iron, steel, plastic or fibrocement, with a diameter equalling or exceeding a preset minimal diameter. For instance, the tube T may be a ductile cast iron pipe with a flared end for fitting another pipe. Furthermore, this tube can have a strictly circular cross-section as well as an oval or even elliptical cross-section. A first embodiment of the cutting device of the invention will be described with reference to FIGS. 1 through 5. The device includes a static frame 1 which is equipped with two carrier rollers 2, 6 designed to support the end to be cut of a tubular part T. The rollers 2, 6 are placed symmetrically in relation to the lengthwise axis X—X of the tube T that is horizontally placed parallel to the rotational axes of the rollers 2, 6. This tube T can especially be a cast iron fitting pipe $T_1$ (FIGS. 2 and 3). Additional means, which will be later described, support and immobilize the tube T against axial translation and are located at its end opposite that which must be cut.

The two carrier rollers 2 and 6 are placed below the horizontal plane which passes through the X—X axis of the tube T. Their rotational axes are parallel to the axis X—X and they are symmetrical in relation to the vertical axial plane P of the tube T. The roller 2 is driven and the roller 6 is loosely mounted and rotatable. The radial position of the loose roller 6 relative to a plane which passes through the X—X axis and through the axis of the other roller 2 can be adjusted with any appropriate means, for instance with a screw jack, in order to adjust the position of the loose roller 6 to lie at the circumference of the tube T to be cut.

Figure 5:
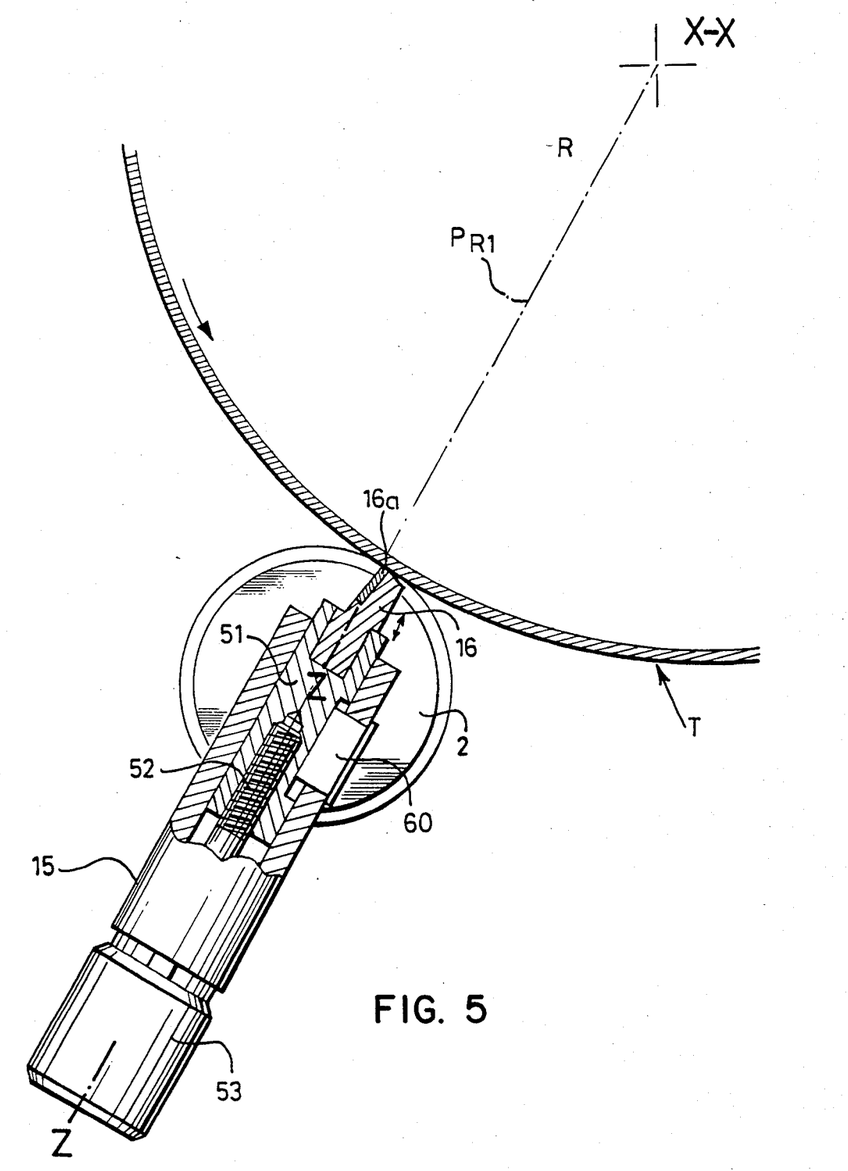
FIG. 5 is an enlarged scale view relative to the previous figures of a semi-lengthwise and semi-elevated section of a cutting tool and the associated roller resting on the wall of the tubular part to be cut for the device of FIGS. 1 through 4.

The roller 2 is coupled to a cutting tool 16 as shown in FIG. 5, according to an arrangement that is comparable to that described in the aforementioned U.S. patent application, Ser. No. 532,630, One of the ends of a drive shaft 4 of the roller 2 is mounted on a rise 50 of the support frame 1 which also supports the associated cutting tool 16, and the shaft 4 can be rotationally driven at a constant speed which can be adjusted with a motor 3. The tool 16 is mounted to slide inside a cylindrical sleeve or sheath 15 that is mounted onto the frame 1. The tool 16 is affixed in a known way to the end of a tool carrying nut 51 (FIG. 5) which can slide in the sleeve 15. A screw 52 is axially engaged inside the nut 51 and it can be driven in a rotation by the coupling which is attached to the output shaft of a motor 53 with an angular coder. This motor 53 may be a stepping motor or other types. The tool carrying nut 51 is keyed to a slot in the sheath 15 by a key 60 which gives it a certain translational freedom inside the sheath 15. The drive motor 53 makes it possible, according to its rotational direction, to make the tool 16 move forward or backward, as indicated by the double arrow in FIG. 5.

For a given diameter of the tube T to be cut, as illustrated in FIG. 5, the cutting edge 16a of the tool 16 is located in a radial plane $P_{R1}$ which crosses through the X—X axis and which contains the Z—Z displacement axis of the tool 16. In FIG. 5, the radial plane $P_{R1}$ uses as a trace a radius of the circular section of the tube T. However, this is no longer true if the diameter of the pipe to be cut varies, to the extent that the inclination of the tool 16 has not been altered.

The cutting edge 16a is composed in a well known manner, for instance of a tungsten carbide pellet with an appropriate profile. The cutting edge 16a not only cuts a tube (cutting clearance angle), but also cuts with a desired profile (bevel, fillet, etc.) on the outer wall of the tube T.

Together with the rollers 2 and 6, which are placed only below the lower section of the tube T to be cut, i.e., below a horizontal plane which contains the X—X axis, at least one pressing roller 5 is included to press the tube T against the carrier rollers 2, 6. The pressing roller 5, the axis of which is parallel to the X—X axis of the tube T, is mounted on a frame 7 which can pivot on a static stand 9 around a horizontal axis or trunnion 10, perpendicular to the X—X axis of the tube T. The frame 7 is placed in front of the end of the tube T to be cut. The upper part of the frame 7 is attached to a tubular support which contains the drive axis of the roller 5. A motor 8 to drive the roller 5 in a direction is affixed to that support (FIGS. 2 and 3). A bidirectional jack 12 is mounted on and is rotatable around an axis 14 which is parallel to the axis 10 and attached to the stand 9. The end of the stem of the jack 12 is connected to a lever 11 that is attached to the frame 7, and is rotatable around an axis 13 which is parallel to the axes 10 and 14.

With this arrangement it is possible to introduce the roller 5 inside the end of the tube T to be cut (position of FIG. 2) in order to maintain the tube T against the carrier rollers 2 and 6 during the cutting operation. Then, the roller 5 can be withdrawn outside of the cut end (position in FIG. 3) by activating the jack 12, which pivots the frame 7 and the roller 5 inside the tube T about the axis 10. At the same time, the jack 12 pivots around axis 14. The roller 5 therefore can tilt around the axis 10.

According to a detail of the invention, the inner pressing or "pinching" roller 5 is placed between the carrier rollers 2, 6 supporting the tube T at a small angular distance ($\alpha$) (FIG. 1) inside the roller 2 that is coupled with the cutting tool 16. To be more precise, the roller 5 is positioned so that the radial plane $P_{R1}$ which passes through the X—X axis of the tube T and through the axis of the carrier roller 2 is displaced by the angular distance $\alpha$ from the radial plane $P_{R2}$ which crosses through the axis of the inner or pressing roller 5. The pressing roller 5 therefore can tilt around the axis 10 (FIGS. 2 and 3) in a vertical plane that contains the axis of the activating jack 12, and which is perpendicular to the axis 14. This vertical plane is located between the median axial plane P and the vertical plane which passes through the contact line between the roller 2 and the wall of the tube T.

Furthermore, the tube T is supported, at its fitting end $T_1$, by axial retention and translation immobilizing rollers 19 and 55 (FIGS. 2 and 2A). The fitting end $T_1$ therefore is supported on two carrier rollers 19 (only one of which is visible on the drawings), and is axially maintained by a roller 55, the rotating axes of those rollers being horizontal and parallel to the X—X axis. As described in the previously mentioned U.S. patent application, the inner roller 55 has a central peripheral groove 55a which is positioned to accommodate a ring-shaped flange 56 which forms part of the inner profile of the fitting end $T_1$. The cross-section of the central groove 55a is trapezoidal (FIG. 2A), with an opening angle $\alpha_1$ which is somewhat greater than the opening angle $\alpha_2$ of the trapezoidal flange 56. This configuration makes it possible to maintain the axial position of the tube T without slack while it is being cut. Axial slack can cause the cutting tool 16 to break. The ring-shaped flange 56 therefore bears with its corners on the sides 55b of the groove 55a, instead of on its bottom. Indeed, if we made the inner annular surface 56a of the groove 56 to bear on the bottom of the groove 55a, the widths of that bottom and of the inner surface 56a would have to be strictly equal in order to avoid any danger of axial slack of the tube T during its rotation. However, the manufacturing tolerances for pipes, especially made of cast iron, cannot ensure so rigorous a dimensional tolerance.

Finally, the support means of the tube T are completed by a twin wheel 18 (FIGS. 2 and 3) in a manner which is similar to that described in French Patent Application No. 82.16 039 and the previously mentioned U.S., patent application, Ser. No. 532,630.

The use of the cutting device which has just been described is as follows.

The tube T is placed against the rollers 19 on one end and the rollers 2, 6 on the other end. Then the jack 12 is activated to move from the withdrawn position of the pressing roller 5 shown in FIG. 3, to cause the frame 7 and the roller 5 to tilt up to the position shown in FIGS. 1 and 2. In this new position, the roller 5 is inside the end of the tube to be cut and it presses it against the carrier rollers 2 and 6. Since the tool 16 is angularly positioned in expectation of a known series of pipe diameters so that its cutting angle remains within the previously stated tolerance limits upon changes of the tube diameter, the motors 3 and 8 are set in motion to rotate the corresponding rollers 2 and 5 and to thereby rotate the tube T. At the same time, the motor 53 is started which ensures the step-by-step (or constant) advance of the tool 16 through the wall of pipe T, as the latter rotates.

During the cutting operation, the internal pressing roller 5 exerts a force on the internal wall of the tube T which is opposed to that being exerted by the tool 16 on the outer wall. Consequently, it is possible to force the tube to be cut against the cutting edge 16a of the cutting tool 16.

Also, the angular displacement $\alpha$, between the axial plane $P_{R2}$ of the pressing roller 5 and the radial plane $P_{R1}$ of both the carrier roller 2 and of the cutting tool 16 (FIG. 1), makes it possible to force the tube T against the two outer carrier rollers 2 and 6, in the opposite direction from the inward radial force of the cutting tool 16. The inward force tends to make the tube T lose contact with its carrier rollers 2 and 6. The combination of the three rollers 2, 6 and 5 having this angular displacement therefore ensures a stable balance for the tube T on the carrier rollers 2 and 6 during the cutting operation.

We should note that, without this angular displacement $\alpha$, the inner pressing roller 5 if placed in the radial plane $P_{R1}$ would simply pinch the wall of the tube T against the outer carrier roller 2, and so it would not be able to prevent the tubular section to be cut from lifting and losing contact with the other carrier roller 6. In order to restore the stable contact of the tube T with the carrier roller 6, then a second inner pressing roller is needed, for instance, located radially inward of the roller 6 or with a slight angular displacement.

When the cutting is over, the cut end 57 (FIG. 2) is removed with means that are not depicted. The motors 3, 8 and 17 are stopped and the jack 12 is triggered so as to withdraw the roller 5 outside of pipe T by tilting the frame 7 around axis 10, up to the position shown in FIG. 3.

Figure 10:
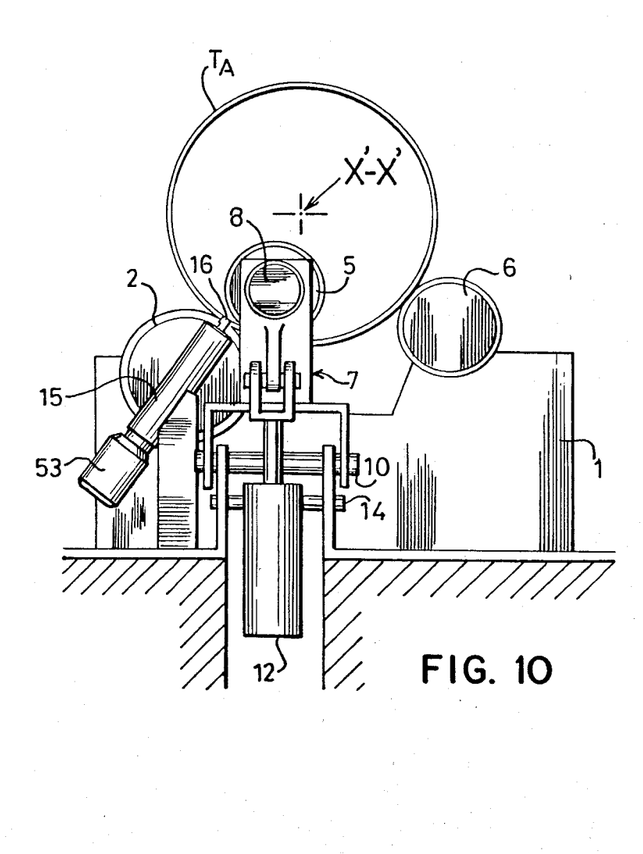
FIG. 10 is an elevated end view which is analogous to FIG. 1 but in which the device is adjusted to cut a tubular part with a diameter that is significantly smaller than that of the visible part in FIG. 1.

Then the subsequent cutting operation can proceed. The combination of the carrier rollers 2 and 6 together with the pressing roller 5 can be adapted to tubes T of various diameters, by moving only one of the rollers. Thus, FIG. 10 depicts the mechanical cutter which has just been described but on which is placed a tube $T_A$ to be cut with a diameter that is significally smaller than that of tube T from FIGS. 1-3.

Figure 11:
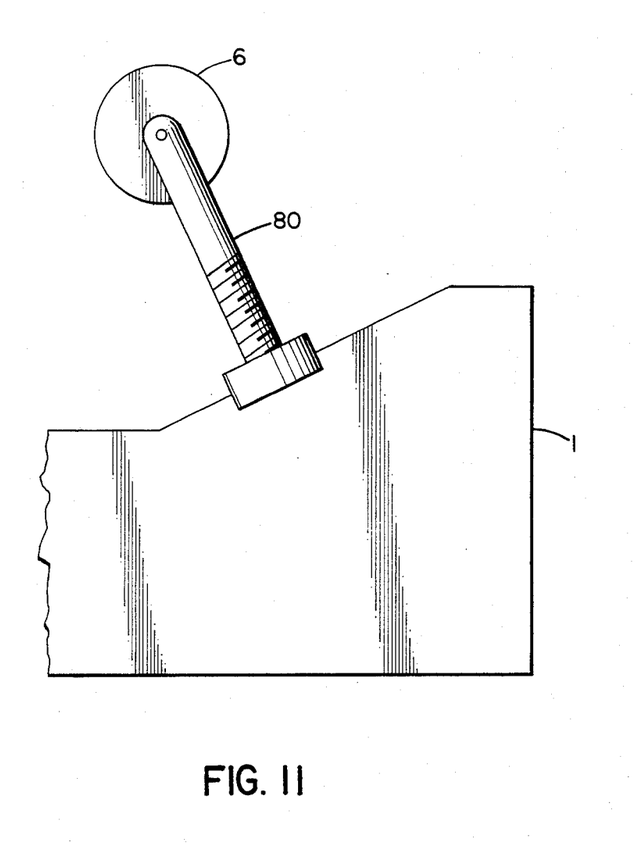
FIG. 11 is a partial end view of an embodiment in which both carrier rollers are adjustable.

In order to allow the tool 16 to cut tube $T_A$ under optimal cutting conditions, the loose carrier roller 6 is simply shifted without changing the relative positions of the carrier roller 2 and of the pressing roller 5. The loose roller 6 is shifted by any appropriate means, for instance, by a screw jack 80, shown in FIG. 11 either radially toward the X'—X' axis of tube $T_A$, or vertically upward, or even obliquely in an intermediate direction between the vertical direction and the radial direction. The central point is to bring the roller 6 closer to the axis X'—X' and to bring the axis X'—X' into the radial plane $P_{R1}$ containing the axis of roller 2 and the cutting edge of the cutting tool 16.

As a variation, in order to accommodate a tube $T_A$ with a diameter that is smaller than the tube T of the tube previous example, the rollers 2 and 6 could be maintained in their prior positions and the position of pressing roller 5 simply altered, thereby altering the value of the displacement angle $\alpha$ between roller 5 and the radial plane $P_{R1}$. Because of its tilt around the trunnion 10, under the action of jack 12, the roller 5 could adopt on its own the new support position against the inner wall of the tube $T_A$.

As an example, we can cut with the device according to the invention a series of pipes of which the diameters range from about 300 mm to 1,000 mm and beyond.

The concentration of rollers below the lower section of the pipe to be cut makes it possible to substantially reduce their number and the size of their support frame, relative to a frame which completely surrounds the tube and is equipped with rollers distributed on the circumference of the tube, as described in the U.S. patent application, Ser. No. 532,630. The minimal acceptable threshold for the diameter of the pipes is obviously imposed by the need to introduce the pressing roller 5 inside said pipe.

The implementation of the cutting device of the present invention is substantially simpler than the previously mentioned prior device which includes outer rollers along the entire circumference of the pipe, and is consequently easier to use.

Furthermore, the slight angular displacement $\alpha$, between the radial places which pass through the axis of the motorized roller 2 that is coupled to the tool 16 and through the axis of the inner pressing roller 5, makes it possible to maintain the tube in proper contact against the carrier rollers 2 and 6, while avoiding any chance of breaking the tube or of tilting it outwardly beyond the cutting tool.

Figure 7:
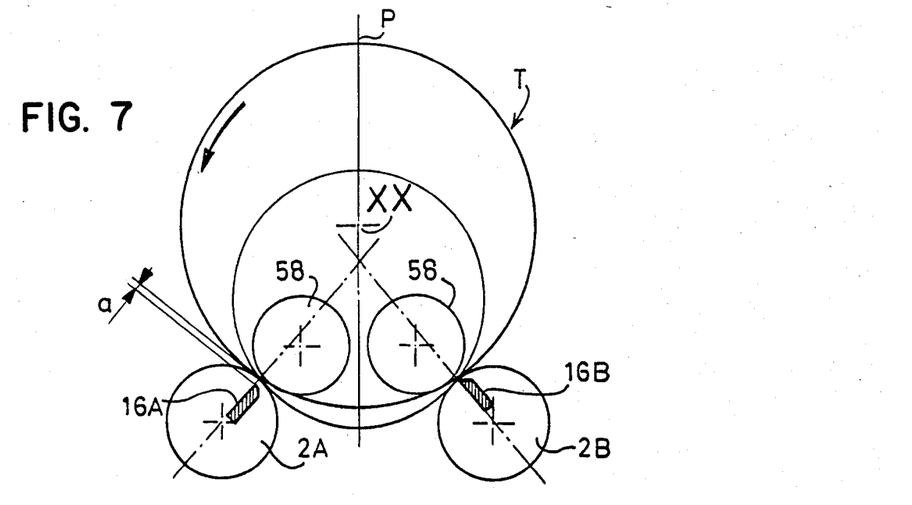

Another embodiment of the invention which is depicted in FIG. 7 differs from the previous ones by the fact that it includes two motorized carrier rollers 2A, 2B, each coupled to a cutting tool 16A, 16B in the same way as the roller 2 and the tool 16 of the previous embodiment. These elements are placed symmetrically in relation to the axis X—X of the tube T and in relation to the vertical plane P which contains the X—X axis. In addition, the device is equipped with two pressing rollers 5B inside the tube T, and are slightly displaced towards the center or the axial vertical plane P of the tube T, relative to the corresponding carrier rollers 2A, 2B. Each displacement corresponds to the angle α which is defined in FIGS. 1-5.

It is noted that the tool 16A is radially shifted, relative to the tool 16B away from the tube T, by a passing depth a. With this arrangement, cutting time is halved.

As in the previous variations, it is possible to maintain a constant cutting angle for a given diameter, by making the position of the tools 16A, 16B vary, either manually or automatically.

This embodiment makes it possible to accommodate pipes of which the diameters are within a range of about 800 to 1,000 mm and it is more particularly useful for cutting thick tubular walls.

Figure 6:
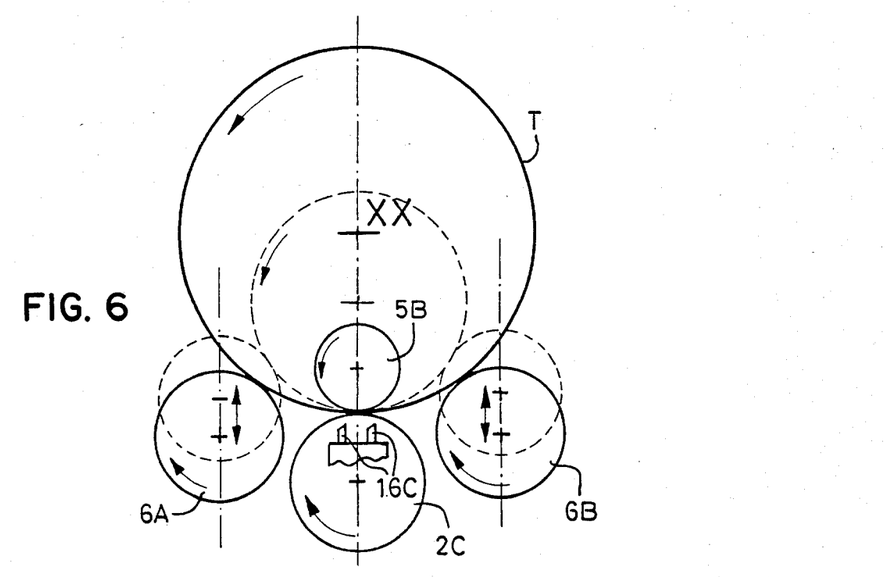
FIGS. 6 and 7 are schematic elevated end views which illustrate two additional embodiments of the cutting device as intended by the invention.
Figure 8:
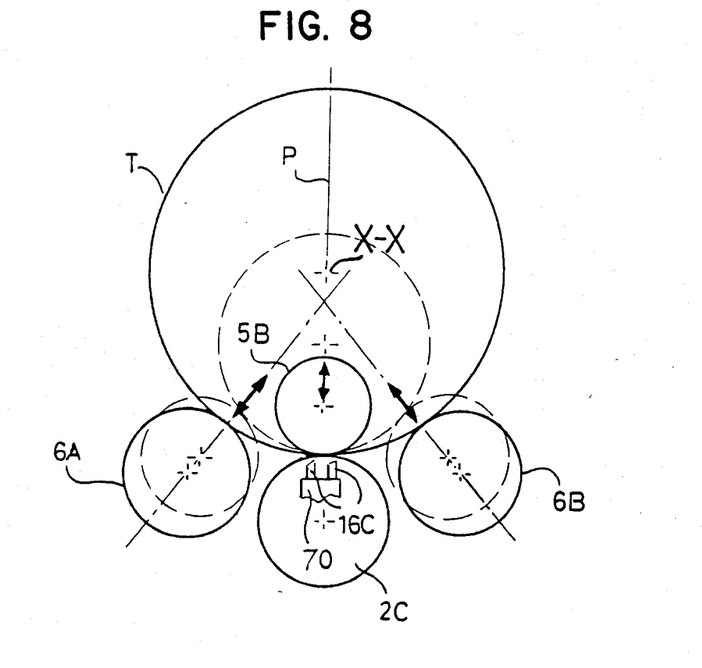
FIG. 8 is a schematic elevated end view of another embodiment of the cutting device according to the invention.
Figure 9:
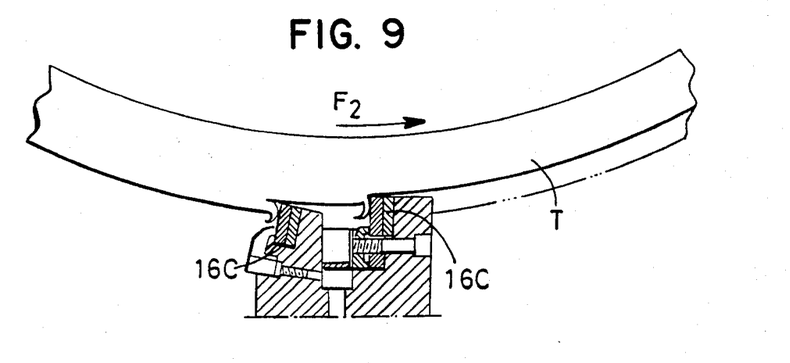
FIG. 9 is a partial elevated view at an enlarged scale relative to FIG. 8 which depicts the positioning of the cutting tools of that embodiment.

In another embodiment which is illustrated in FIGS. 8 and 9, the device includes a lower static roller 2C, the axis of which is in the vertical axial plane P. The carrier roller 2C can be driven in a rotation by a motor reducer which is not depicted, and it is coupled to at least one cutting tool. Two tools 16C are shown in the depicted example. Two outer lateral rollers 6A, 6B are placed below the tube T, symmetrically in relation to the vertical axial plane P and to the main roller 2C. The distance between those rollers 6A, 6B, and the X—X axis is adjustable by displacements along a radial direction, a vertical direction (a variation of FIG. 6) or alternatively an oblique intermediate direction between the radial and the vertical ones. The device also includes an inner pressing roller 5B which can be rotationally driven and which has its axis located in the vertical axial plane P.

The assembly of tolls 16C in their support, which is schematically depicted in FIG. 9, is itself known and will not be described in detail.

One of the tools 16C, or the tool that is located to the right on FIGS. 8 and 9, is radially shifted relative to the other tool 16C by a passing depth towards the X—X axis. In view of the rotational direction of the tube T (arrow $F_2$), this positioning makes it possible to halve the time for one cutting operation, just as in the embodiment of FIG. 7.

However, contrary to the embodiment of FIG. 7, the distance between the tools 16C is restricted to the width of their joint support 70, whereas the maximum distance in FIG. 7 is the inter-axial separation of the coupled rollers 2A and 2B. The coupled tools 16C are radially coupled to the carrier roller 2C by being located on either side of but close to the radial plane P, in order to distribute properly the cutting or passing depth of each coupled tool 16C. The distance between the support roller 6A (located at about 8 o'clock, if one considers the face of a clock), and the X—X axis can be adjusted either manually or automatically as a function of the diameter of the pipe to be cut by a radial displacement or otherwise, for instance with a screw jack.

The second roller 6B (located at about 4 o'clock) makes it possible for a jack (pneumatic for instance), which is associated to it, to force the tube T against the other roller 6A. Roller 6B therefore ensures lateral stability of pipe T during its rotation, while the central roller 2C exerts pressure on the wall of the tube T, which is in a pinched position between the roller 2C and the inner roller 5B. Roller 5B can be withdrawn in the same way as roller 5. The rollers 5B and 2C are rotationally driven, while rollers 6A, 6B are loosely mounted on their axes. It is noted that the roller 6B can be shifted vertically as well as radially in relation to pipe T, the central point being that this roller exerts pressure during rotation on the tube T, which tends to force it onto the roller 6A in order to ensure its lateral stability.

As in previous embodiments, the pinching effect of the roller 5B is ensured by a tilting frame which is activated by a jack.

Furthermore, the advance of both the tools 16C into the wall of the tube T takes place simultaneously with one single tool carrier 70, and therefore with a single motorized driver means.

I claim:
1. A cutting device for a tube (T), comprising:
   a static frame (1);
   two carrier rollers (2, 6) mounted on said frame for supporting horizontally such tube from below, an axis of each carrier roller lying parallel to an axis of such tube;
   drive means (3) connected to at least one of said carrier rollers for rotating at least one of said carrier rollers and for rotating such tube on its axis (X—X);
   a cutting tool (16);
   means on said frame mounting said cutting tool and a driven one of said carrier rollers along a radial plane of such tube and
   at least one pressing roller (5) for forcing such tube against said carrier rollers;
   means spaced from said frame and connected to said pressing roller for moving said pressing roller radially outwardly into engagement with the interior of such tube and against the wall of such tube;
   wherein said moving means comprises a chassis (7) on which said at least one pressing roller is mounted for moving said pressing roller into the interior of such tube and for withdrawing said pressing roller from such tube after completion of cutting; and said moving means places said at least one pressing roller between the two carrier rollers at a small angular distance (α) from one of the driven carrier rollers to which said cutting tool is coupled, said small angular distance being measured between a carrier radial plane ($P_{R1}$) passing through the axis (X—X) of such tube and through the axis of said one carrier roller and the pressing radial plane ($P_{R2}$) passing through the axis (X—X) of such tube and through the axis of said pressing roller, said pressing radial plane being located between the vertical axial plane (P) of such tube and the carrier radial plane.

2. A cutting device, as recited in claim 1, wherein said chassis comprises:
   a stand (9) disposed beyond the end of such tube to be cut;
   a support chassis (7);

means pivotally coupling said support chassis about a horizontal axis (10) on said stand;

a rotation drive motor (8) coupled to said pressing roller and mounted on said support chassis;

a jack (12) connected to said chassis (7) for pivoting said chassis (7) about its axis with said stand; and means pivotally coupling said jack about an axis (14) on said stand.

3. A cutting device, as recited in claim 1, wherein both of said carrier rollers are driven by said drive means and are mounted along respective radial planes with respective cutting tools (16A, 16B).

* * * * *